United States Patent

Artaud

[11] 4,112,055
[45] Sep. 5, 1978

[54] METHOD OF FABRICATION OF URANIUM OXIDE UO₂ BY THE DRY PROCESSING ROUTE AND A DEVICE FOR THE PRACTICAL APPLICATION OF THE METHOD

[75] Inventor: Robert Artaud, Aix-en-Provence, France

[73] Assignee: Commissariat a l'Energie Atomique, France

[21] Appl. No.: 682,747

[22] Filed: May 3, 1976

[30] Foreign Application Priority Data

May 9, 1975 [FR] France .................. 75 14490

[51] Int. Cl.² ............... C01G 43/02; C01G 43/06
[52] U.S. Cl. .................................. 423/261; 423/253
[58] Field of Search .................. 423/253; 423/261

[56] References Cited

U.S. PATENT DOCUMENTS

| | | |
|---|---|---|
| 3,168,369 | 2/1965 | Reese et al. .............. 423/261 X |
| 3,235,327 | 2/1966 | Blundell et al. ............ 423/261 |
| 3,547,598 | 12/1970 | Knudsen .................. 423/261 |
| 3,765,844 | 10/1973 | Rode ...................... 423/261 X |
| 3,845,193 | 10/1974 | Littlechild et al. .......... 423/261 |
| 3,871,829 | 3/1975 | Keith et al. ............... 423/261 X |
| 3,906,081 | 9/1975 | Welty ..................... 423/261 |

*Primary Examiner*—Richard E. Schafer
*Attorney, Agent, or Firm*—Lane, Aitken, Dunner & Ziems

[57] ABSTRACT

In a first step, uranium hexafluoride gas is reacted with steam in a first region of a vessel. In a second step, the oxyfluoride UO₂F₂ obtained in the first step is converted to UO₂ in a two-stage reduction process in which it is first contacted with a mixture of hydrogen gas and steam in one zone of the second region of the vessel, then contacted with the hydrogen gas in another zone of the second region.

6 Claims, 1 Drawing Figure

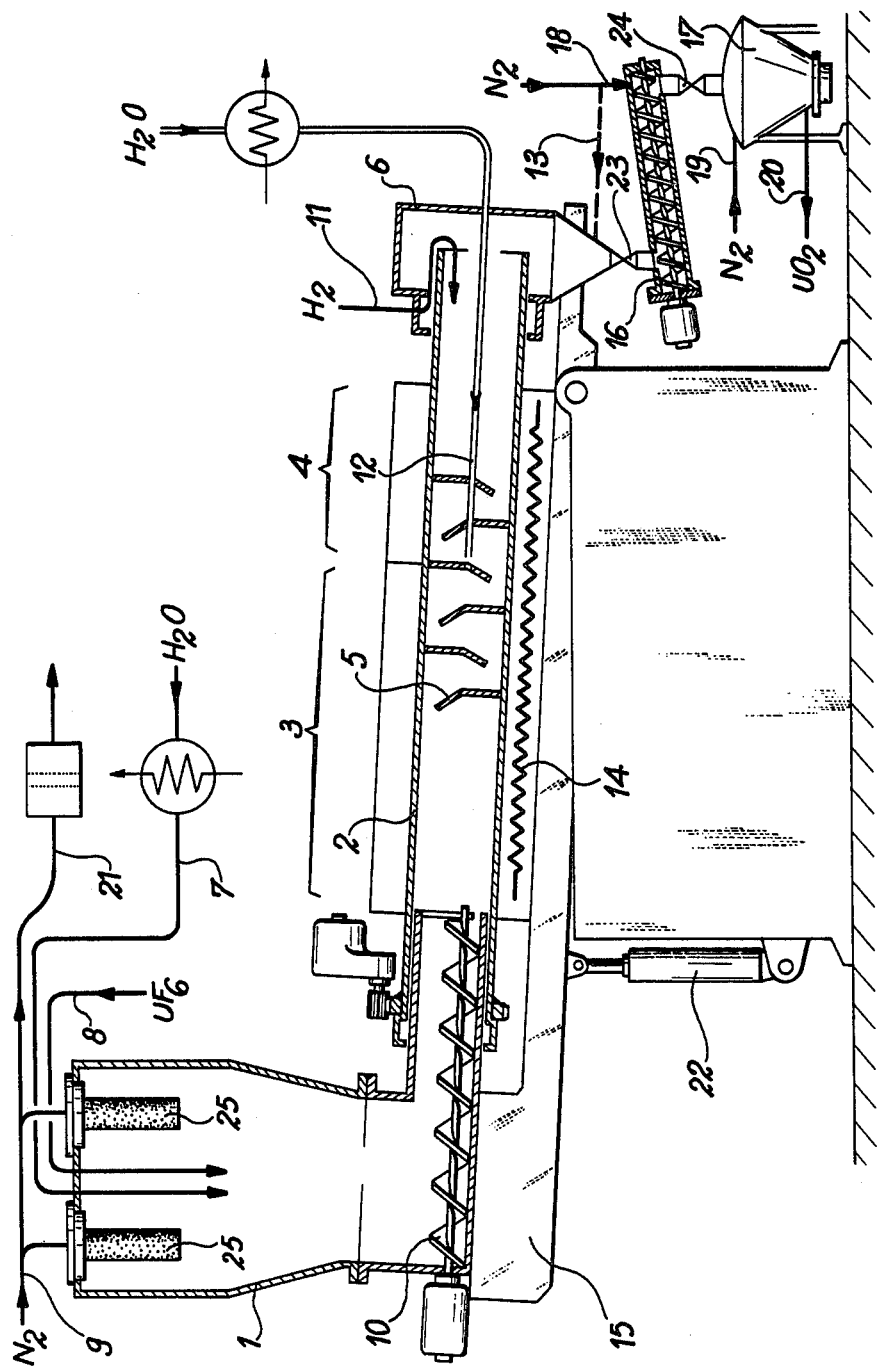

METHOD OF FABRICATION OF URANIUM OXIDE UO₂ BY THE DRY PROCESSING ROUTE AND A DEVICE FOR THE PRACTICAL APPLICATION OF THE METHOD

This invention relates to a method of fabrication of uranium oxide $UO_2$ by the dry processing route and to a device for the practical application of said method.

In a certain number of methods of the prior art, the dry-route fabrication of uranium oxide $UO_2$ from uranium hexafluoride $UF_6$ consists in a first step in subjecting the uranium hexafluoride to hydrolysis in order to obtain a uranium oxyfluoride $UO_2F_2$ and, in a second step, in subjecting said uranium oxyfluoride $UO_2F_2$ to a reduction in order to convert it to uranium oxide $UO_2$, these two steps being carried out in the same vessel.

The precise aim of the invention is to provide an extremely advantageous improvement in the method recalled in the foregoing whereby a uranium oxide having the necessary physical properties to permit easy sintering may be obtained in a reproducible manner.

The method in accordance with the invention consists of a first step in which uranium hexafluoride gas is reacted with steam within a first region of a vessel and of a second step in which the oxyfluoride $UO_2F_2$ obtained during the first step is subjected to a reduction within a second region of said vessel in such a manner as to obtain uranium oxide $UO_2$. Said method is primarily distinguished by the fact that the second step consists of a first stage in which the oxyfluoride $UO_2F_2$ obtained during the first step is contacted with a mixture of hydrogen gas and steam in a first zone of the second region of said vessel and of a second stage in which the oxide having an intermediate composition between $U_3O_8$ and $UO_2$ thus obtained is contacted with the hydrogen gas within a second zone of the second region of said vessel, the temperature of said second zone being higher than the temperature of said first zone and wherein the reaction gases which pass out of the second zone so as to penetrate into the first zone of the second region of said vessel follow a non-rectilinear path.

All the arrangements mentioned in the foregoing make it possible to obtain a uranium oxide having a low fluoride content.

It is preferably ensured that, in the first step, the reaction between the uranium hexafluoride gas and the steam is carried out at a temperature within the range of 600° to 1200° C and preferably within the range of 850° to 900° C. In the second step, the reaction can preferably be carried out in the first stage at a temperature within the range of 600° to 760° C and in the second stage at a temperature within the range of 760° C and 800° C.

The present invention is also directed to a device for carrying the method of fabrication of uranium oxide $UO_2$ as described in the foregoing. This device essentially comprises a vertical chamber which opens at the bottom portion thereof into a horizontal rotary furnace which rotates about its longitudinal axis, said furnace being so arranged as to have two zones separated by a certain number of baffle-plates and to penetrate at the free end thereof into a chamber for the recovery of uranium oxide which has formed.

In accordance with a particular feature of the device which forms the subject of the invention, the length of the first zone of the horizontal furnace, namely the zone located nearest the bottom of the vertical chamber, is twice the length of the second zone, namely the zone located at the greatest distance from the bottom of the vertical chamber.

A more complete understanding of the invention will be gained from the following description of the mode of execution of the method in accordance with the invention, reference being made to the accompanying FIGURE in which the device in accordance with the invention is illustrated diagrammatically.

This device essentially comprises a vertical chamber 1, the bottom portion of which opens into a horizontal rotary furnace 2 having two zones 3 and 4 which are separated by baffle-plates 5.

The first reaction between the uranium hexafluoride gas and the steam takes place within the chamber 1; the formed oxyfluoride $UO_2F_2$ falls under the action of gravity to the bottom portion of the chamber 1 and is carried by suitable means into the zone 3 of the furnace 2 in which it is contacted in countercurrent flow with a mixture of hydrogen and steam; the oxide thus obtained and having an intermediate composition between $U_3O_8$ and $UO_2$ then passes through baffle-plates 5 into the zone 4 of the furnace 2 in which it is contacted in countercurrent flow with hydrogen gas. The oxide $UO_2$ is then recovered within the chamber 6. The entire device is at a slight overpressure with respect to the surrounding atmosphere, thus preventing any admission of ambient air and removing explosion hazards.

In more precise terms, the first step of the method is carried out by injecting steam and uranium hexafluoride gas into the top portion of the chamber 1, at 7 and 8 respectively and in the vicinity of each other. The temperature of the wall of the chamber 1 is 250° to 300° C and the uranium hexafluoride and the steam are injected at this temperature. If so desired, it is also possible to introduce at 9 an inert gas such as nitrogen which does not perform any chemical function in the reaction but is more readily conducive to the prevention of clogging of the injectors.

The uranium hexafluoride and the steam which are introduced together into the chamber 1 form a "cloud"; since the reaction is exothermic, the temperature of said cloud is within the range of 600° to 1200° C and is usually between 850° and 900° C. The uranium oxyfluoride powder $UO_2F_2$ which is formed falls under gravity to the bottom of the chamber 1 and is consequently withdrawn immediately from the reagent gas atmosphere in a time interval of less than one second. In respect of given parameters of the first step of the method, it is thus possible to obtain an oxyfluoride $UO_2F_2$ of constant quality. Furthermore, the flow rate of the residual gases which are derived from the second step of the method performed within the furnace 2 and are constituted by steam, hydrogen and hydrofluoric acid is of low value in comparison with the flow rate of the reagent gases $UF_6$ and $H_2O$ : in consequence, the formed oxyfluoride $UO_2F_2$ is little affected by these residual gases.

The formed oxyfluoride powder $UO_2F_2$ is introduced from the bottom of the chamber 1 into the first zone 3 of the furnace 2 by any suitable transfer means such as a screw conveyor 10, for example. In this first zone 3 of the furnace 2, the oxyfluoride $UO_2F_2$ is passed in counterflow to a mixture of hydrogen introduced into the furnace 2 at 11, steam introduced at 12, and if necessary an inert gas such as nitrogen introduced at 13; this countercurrent flow takes place at a temperature within the range of 600° to 760° C. The uranium oxide obtained and having an intermediate composition between $U_3O_8$ and $UO_2$ passes through the baffle-plates 5 within the zone 4 of the furnace 2, in which it is contacted in countercurrent flow with the hydrogen gas introduced at 11 and if necessary the inert gas such as nitrogen which is introduced at 13. In this zone 4, the reduction is therefore completed and the proportion of fluorine and of water contained in the final uranium oxide $UO_2$ is reduced. The temperature at which this last reaction takes place is higher than that of the reaction which takes place in the zone 3, that is, within the range of 760° to 800° C.

It will be noted that the heating of the zones 3 and 4 of the furnace 2 is carried out by means of heating elements 14 placed against the external wall of the furnace 2. Moreover, in order to vary the time of residence of the powder within the furnace 2, the slope of the frame 15 of said furnace can be modified by means of the jack 22.

The uranium oxide $UO_2$ which is formed within the furnace 2 is transferred into the chamber 6 and falls under gravity to the bottom portion of said chamber which is fitted with a valve 23. From this point, said uranium oxide is transferred by any suitable means such as a screw conveyor 16, for example, through a valve 24 into a container 17. The screw conveyor 16 can be put under a pressure of inert gas such as nitrogen which is introduced at 18, in order to cool the uranium oxide. In addition, the nitrogen passes through the valve 23 after sweeping the screw conveyor 16 and penetrates into the chamber 6. By virtue of the overpressure which it produces within said chamber and the effect of entrainment of the hydrogen within the interior of the furnace 2, said nitrogen prevents leakages of hydrogen to the exterior. In order to remove the uranium oxide from the container 17, said container is isolated by closing the valve 24 and subjected to a purge flow of inert gas such as nitrogen which is introduced at 19, thus causing the removal of the uranium oxide at 20.

The discharge of the residual gases derived from the two steps of the method takes place at 21 at the top portion of the chamber 1 through at least one self-cleaning filter 25. The gases which do not contain uranium can undergo any treatment of conventional type without producing contaminated effluents.

Two examples of application of the method in accordance with the invention are given hereunder without any implied limitation.

EXAMPLE 1

Uranium hexafluoride gas is introduced at 8 into the chamber 1 at a flow rate of 75 kg/h, (namely 4.77 m$^3$/h at normal temperature and pressure), which represents 50.7 kg/h of uranium. Steam is introduced at the same time at 7 at a flow rate of 17 kg/h (namely 21 m$^3$/h). Steam is also introduced at the same time at 12 at a flow rate of 18 kg/h (namely 22.4 m$^3$/h) and hydrogen gas is introduced at 11 at a flow rate of 9.5 m$^3$/h and nitrogen is introduced at 13 at a flow rate of 3 m$^3$/h. The uranium oxide $UO_2$ which has formed within the container 17 is then recovered.

EXAMPLE 2

Uranium hexafluoride is introduced at 8 into the chamber 1 at a flow rate of 60 kg/h, (namely 3.8 m$^3$/h at normal temperature and pressure), which represents 40.5 kg/h of uranium. Steam is introduced at the same time at 7 at a flow rate of 13.5 kg/h (namely 16.8 m$^3$/h). Steam is also introduced at the same time at 12 at a flow rate of 10 kg/h (namely 12.5 m$^3$/h) and hydrogen gas is introduced at 11 at a flow rate of 7.6 m$^3$/h and nitrogen is introduced at 13 at a flow rate of 3 m$^3$/h. The uranium oxide which has formed in the container 17 is then recovered.

There have been determined at the inlet of each of the zones 3 and 4 the respective compositions of the gas mixtures indicated hereunder by the partial pressures of each gaseous constituent.

|  | Admission of gases into zone 3 | Admission of gases into zone 4 |
|---|---|---|
| $pH_2O$ | 0.66 bar | 0 |
| $pH_2$ | 0.23 bar | 0.69 bar |
| $pN_2$ | 0.11 bar | 0.31 bar |

The uranium oxide $UO_2$ produced by the method of Example 1 or of Example 2 has the following properties:

| | |
|---|---|
| apparent density | : 2 to 2.4 |
| specific surface area | : 2 to 4 m$^2$/g |
| mean diameter | : 0.8 to 1.1 $\mu$ |
| fluorine content | : <10 ppm |

Shaping and compacting with a press under a pressure of 4000 bar results in the production of $UO_2$ pellets having a crude-state density of 6. After sintering at 1720° C, said pellets have a density of 10.85, which is 98.9 % of the theoretical density.

It is thus apparent that a uranium oxide $UO_2$ of good quality is obtained by virtue of the method according to the invention. The fact that the second step of the method is performed in two successive stages consisting first in reduction by a mixture of hydrogen gas and steam and then in reduction by hydrogen alone makes it possible to obtain a uranium oxide having the necessary physical properties for ensuring that it is suitable for sintering. In fact, this second stage of the second step of the method which consists in completing the reduction process and in reducing the proportion of fluorine and of water contained in the oxide obtained from the first stage is wholly advantageous. In fact, the following results are obtained:

| $UO_2$ produced | without final treatment with hydrogen alone | with final treatment with hydrogen alone |
|---|---|---|
| Water content | 2000 ppm | <1000 ppm |
| Ratio O/U | 2.05 to 2.06 | 2.02 to 2.03 |

Thus, by virtue of these two successive stages, an oxide $UO_2$ is obtained without any inclusions of an oxide consisting of either $U_3O_8$ or $UO_3$, there is an increase in apparent density without any reduction in specific surface area and there is also an improvement in the flowability of the $UO_2$ powder produced, thus facilitating the shaping of the pellets. An improvement in the appearance of the pellets after sintering is also observed, particularly a reduction of internal flaws.

Moreover, the fact that, in the device in accordance with the invention, the zones 3 and 4 of the furnace 2 are separated by a certain number of baffle-plates 5 has the advantage on the one hand of preventing back-diffusion of the gases, namely of the steam and especially of the fluorine, thus avoiding the need to increase the proportion of fluorine and water contained in the $UO_2$ and on the other hand of providing a better separation between the two temperature zones 3 and 4 by reducing radiant heat transfer processes. This improvement is clearly brought out by the fact that, if uranium oxide were produced in a furnace without baffle-plates between the two zones, there would be obtained a uranium oxide having a fluorine content in excess of 100 ppm whereas a uranium oxide having a fluorine content which is below 10 ppm is obtained by means of the device of the invention in which provision is made for baffle-plates.

Thus all the particular arrangements of the method in accordance with the invention and especially the fact that the second step of reduction of the oxyfluoride $UO_2F_2$ is carried out in two separate stages make it possible to obtain in a reproducible manner a uranium oxide which has excellent properties and which can in particular be very readily sintered. As a consequence, practically flawless nuclear fuel pellets can be easily prepared by means of this uranium oxide.

It is pointed out in this connection that a uranium oxide obtained by a method which makes use of the fluidized-bed technique would not offer the advantageous properties of the oxide obtained by means of the method according to the invention. In fact, a uranium oxide of this type would not be homogeneous (size, fluorine content, surface characteristics, sinterability which varies according to the particles); moreover, this uranium oxide could be used only for the fabrication of low-density materials.

We claim:

1. A method of fabrication of uranium oxide $UO_2$ by the dry processing route which consists of a first step in which uranium hexafluoride gas is reacted with steam within a first region of a vessel and of a second step in which the oxyfluoride $UO_2F_2$ obtained during the first step is subjected to a reduction within a second region of said vessel so as to obtain the uranium oxide $UO_2$, wherein the second step consists of a first stage in which the oxyfluoride $UO_2F_2$ obtained during the first step is contacted with a mixture of hydrogen gas and steam in a first zone of the second region of said vessel and of a second stage in which the oxide having an intermediate composition between $U_3O_8$ and $UO_2$ thus obtained is contacted with hydrogen gas in the absence of steam within a second zone of the second region of said vessel, the temperature of said second zone being higher than the temperature of said first zone and wherein hydrogen is introduced into said second zone and the reaction gases which pass out of the second zone in order to penetrate into the first zone of the second region of said vessel follow a non-rectilinear path, steam is introduced into said first zone and the hydrogen and steam flow countercurrent to the oxyfluoride and the intermediate composition in the first and second zones.

2. A method according to claim 1 wherein, in the first step, the reaction between the uranium hexafluoride gas and the steam is carried out at a temperature within the range of 600° C to 1200° C.

3. A method according to claim 1 wherein, in the second step, the reaction is carried out in the first stage at a temperature within the range of 600° C to 760° C and in the second stage at a temperature within the range of 760° C to 800° C.

4. A method according to claim 1 wherein, in the first step, the reaction between the uranium hexafluoride gas and the steam is carried out in the presence of an inert gas.

5. A method according to claim 1 wherein, in the second step, the reactions are carried out in the presence of an inert gas.

6. A method according to claim 1 wherein, in the first and the second steps, the reactions are carried out in the presence of an inert gas consisting of $U_3O_6$.

* * * * *